(12) United States Patent
Egashira et al.

(10) Patent No.: US 7,700,689 B2
(45) Date of Patent: *Apr. 20, 2010

(54) GOLF BALL MATERIAL, GOLF BALL AND METHOD FOR PREPARING GOLF BALL MATERIAL

(75) Inventors: Yoshinori Egashira, Chichibu (JP); Eiji Takehana, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 515 days.

This patent is subject to a terminal disclaimer.

(21) Appl. No.: 11/443,052

(22) Filed: May 31, 2006

(65) Prior Publication Data

US 2007/0282069 A1 Dec. 6, 2007

(51) Int. Cl.
*A63B 37/12* (2006.01)
*A63B 37/00* (2006.01)
*C08L 33/02* (2006.01)
*C08L 75/02* (2006.01)

(52) U.S. Cl. .......................... 525/126; 525/64; 525/66; 525/74; 525/75; 525/130; 525/175; 525/176; 525/181; 525/183; 525/193; 525/285; 525/289; 525/290; 525/112; 473/373; 473/378; 473/385

(58) Field of Classification Search ....................... None
See application file for complete search history.

(56) References Cited

U.S. PATENT DOCUMENTS

| 5,298,571 | A | * | 3/1994 | Statz et al. | ................ | 525/330.2 |
| 2008/0161456 | A1 | * | 7/2008 | Egashira et al. | .............. | 524/174 |

FOREIGN PATENT DOCUMENTS

| JP | 59091148 | * | 5/1984 |
| JP | 05007635 | * | 1/1993 |
| JP | 2003-180878 A | | 7/2003 |
| WO | WO 98/46671 A1 | | 10/1998 |

* cited by examiner

*Primary Examiner*—David Buttner
(74) *Attorney, Agent, or Firm*—Sughrue Mion, PLLC

(57) ABSTRACT

The invention provides a golf ball material composed of (i) a non-ionomeric thermoplastic resin, (ii) an ionomeric resin and/or an acid-containing polymer which is the base polymer of an ionomeric resin, and (iii) a norbornene dicarboxylic anhydride and/or a derivative thereof. Methods for preparing such a material, and a golf ball which includes as a component therein a part made of the golf ball material are also provided. The golf ball material has a good thermal stability, flow and processability, and can thus be used to obtain high-performance golf balls endowed with an excellent rebound resilience, durability and flexibility.

17 Claims, No Drawings

GOLF BALL MATERIAL, GOLF BALL AND METHOD FOR PREPARING GOLF BALL MATERIAL

BACKGROUND OF THE INVENTION

The present invention relates to golf ball materials which have a good thermal stability, flow and processability and from which there can be obtained high-performance golf balls endowed with excellent properties such as rebound, durability and softness. The invention also relates to golf balls which include as a component therein a molding made from such a golf ball material, and to methods for preparing such golf ball materials.

In recent years, ionomeric resins have been widely used as cover materials for golf balls. Ionomeric resins are ionic copolymers of an olefin such as ethylene with an unsaturated carboxylic acid such as acrylic acid, methacrylic acid or maleic acid, in which some of the acidic groups are neutralized with metal ions such as sodium, lithium, zinc or magnesium. These resins provide excellent characteristics in terms of durability, rebound resilience and scuff resistance of the ball.

At present, the base resins used in golf ball cover materials are generally ionomeric resins, but a variety of modifications are being made to address the constant desire by players for golf balls having a suitable degree of flexibility, a high rebound resilience and an excellent flight performance.

For example, to improve the rebound resilience and the cost characteristics of ionomer cover materials, U.S. Pat. No. 5,312,857, U.S. Pat. No. 5,306,760 and International Application WO 98/46671 describe cover materials composed of an ionomeric resin to which a large amount of a metallic soap has been added.

However, the metallic soap in these cover materials undergo decomposition and vaporization during injection molding, generating a large amount of fatty acid gases. As a result, molding defects tend to arise. Moreover, the gases that have formed deposit on the surface of the molding, markedly lowering its paintability. The rebound resilience characteristics obtained with such cover materials do not differ much from those provided by ionomer covers of the same hardness which contain no metallic soap; the rebound resilience in both cases is about the same. Hence, only a small positive effect is observable from the inclusion of a metallic soap; such addition does not markedly increase the rebound resilience. Moreover, depending on the type of metallic soap used, the processability and the rebound resilience characteristics are sometimes significantly deteriorated (or declined), making the cover material entirely unfit for practical use.

In addition, materials in the form of simple molten mixtures of a soft thermoplastic resin and an ionomer have been developed (JP-A 2003-180878). However, even though the material appears to be uniform during the production process, there has been some concern that when the material is injection molded to form a golf ball layer, the high shear forces during molding will subject the layer formed by the molten mixture to delamination.

An ionomer for use as a golf ball material which has recently been developed is a homogeneous-phase, high-rebound resilience material that has an interpenetrating polymer network (IPN) structure (U.S. Patent Published Application No. 2004/0044136). The ionomer is obtained by mixing a first ingredient such as an ethylene-(meth)acrylic acid copolymer with a second ingredient that is a different type of thermoplastic resin to form a resin composition, then adding a metal ionic species as a third ingredient to neutralize the acids on the first ingredient dispersed in the resin composition. However, in this production method, if the different type of thermoplastic resin used as the second ingredient is poorly compatible or completely incompatible with the ionomeric resin matrix thereby created, when injection molding is carried out using this material to form a golf ball layer, the high shear forces in the mold sometimes cause delamination to occur within the layer, raising concerns over a decline in the properties of the golf ball. This tendency is most clearly observed in thermoplastic resins which have a poor heat resistance and are thus prone to thermal degradation.

SUMMARY OF THE INVENTION

It is therefore an object of the present invention to provide a golf ball material which is able to suppress delamination within a golf ball layer formed by injection molding and thus enables golf balls of the desired properties to be obtained; that is, which has a good thermal stability, flow and processability, and from which high-performance golf balls endowed with excellent durability, scuff resistance and flexibility (suitable hardness) can be obtained. Another object of the invention is to provide a golf ball which includes as a component therein a molding made from such a golf ball material. A further object of the invention is to provide a method for preparing such a golf ball material.

As a result of extensive investigations, we have discovered that an ionomeric resin composition obtained by blending a norbornene dicarboxylic anhydride and/or a derivative thereof, in the presence of a peroxide, with the thermoplastic resin used in the present invention, then melt-mixing the blend with an ionomeric resin under applied heat is capable of suppressing delamination when injection-molded as a golf ball material. We have also found that an ionomeric resin composition obtained by blending such a norbornene dicarboxylic anhydride and/or a derivative thereof, in the presence of a peroxide, with a non-ionomeric thermoplastic resin and an acid-containing polymer that is the base resin of an ionomeric resin so as to form an acid-containing polymer composition, then adding thereto a metal ionic species and carrying out an acid-neutralizing reaction, can serve as a golf ball material which, when injection-molded, suppresses delamination.

We have additionally learned that these ionomeric resin compositions have a surprisingly good thermal stability, flow and processability, and are ideal materials for forming high-performance golf balls of excellent properties such as durability, scuff resistance and flexibility without a loss in the rebound resilience of the molding.

From additional investigations, we have also found that golf balls which include a molding of such a golf ball material as a component therein (here and below, "component" refers to the cover material or the intermediate layer material in a two-piece solid golf ball composed of a core and a cover embracing the core, or in a multi-piece solid golf ball composed of a core of at least one layer, a intermediate layer of at least one layer enclosing the core, and a cover of at least one layer embracing the intermediate layer), have an excellent durability, scuff resistance and flexibility without any loss of rebound resilience.

Accordingly, the invention provides the following golf ball material, methods for preparing such golf ball materials, and a golf ball which includes as a component therein a molding of such a golf ball material.

[I] A golf ball material which includes: (i) a non-ionomeric thermoplastic resin, (ii) an ionomeric resin and/or an acid-containing polymer that is the base polymer of an ionomeric resin, and (iii) a norbornene dicarboxylic anhydride and/or a derivative thereof.

[II] A method for preparing a golf ball material which includes the steps of, in order, melt blending (iii) a norbornene dicarboxylic anhydride and/or a derivative thereof, a peroxide, and (i) a non-ionomeric thermoplastic resin in a temperature range at which the peroxide does not decompose rapidly; adding (ii) an ionomeric resin and/or an acid-containing polymer that is the base polymer of an ionomeric resin; and melt mixing at the temperature or above at which the peroxide decomposes.

[III] A method for preparing a golf ball material which includes the steps of, in order, melt blending (iii) a norbornene dicarboxylic anhydride and/or a derivative thereof, a peroxide, (i) a non-ionomeric thermoplastic resin, and (ii) an acid-containing polymer that is the base polymer of an ionomeric resin in a temperature range at which the peroxide does not decompose rapidly; adding an oxygen-containing inorganic metal compound-typed metal ionic species; and melt blending at the temperature or above at which the peroxide decomposes so as to induce both grafting reaction of the norbornene dicarboxylic anhydride and/or a derivative thereof and neutralization reaction of the acids, thereby obtaining a golf ball material having interpenetrating polymer network structures.

[IV] A golf ball which includes as a component therein a molding made of the above golf ball material, and preferably a golf ball wherein the above golf ball material is used as a cover material or an intermediate layer material in a two-piece solid golf ball composed of a core and a cover which encloses the core, or in a multi-piece solid golf ball composed of a core of at least one layer, an intermediate layer of at least one layer which encloses the core, and a cover of at least one cover which encloses the intermediate layer.

DETAILED DESCRIPTION OF THE INVENTION

The invention is described more fully below.

The golf ball material of the invention is composed of: (i) a non-ionomeric thermoplastic resin, (ii) an ionomeric resin and/or an acid-containing polymer which is the base polymer of an ionomeric resin, and (iii) a norbornene dicarboxylic anhydride and/or derivatives thereof. The method for preparing such a golf ball material involves blending the norbornene dicarboxylic anhydride and/or derivative thereof (iii), in the presence of a peroxide, with the non-ionomeric thermoplastic resin (i) and the ionomeric resin (ii), then melt mixing under applied heat. Alternatively, instead of the ionomeric resin, the acid-containing base polymer thereof is used, and melt mixing is carried out under applied heat in the same way as above.

The present invention relates to Monomeric resin systems, which generally have a poor compatibility with non-ionomeric thermoplastic resins. Specifically, it provides an ionomeric resin composition that includes a non-ionomeric thermoplastic resin, of which the Monomeric resin composition suppresses delamination during injection molding.

Moreover, during the intensive study on the ionomeric resin compositions containing therein non-ionomeric thermoplastic resins as its object of the preparation of a golf ball material that suppresses delamination during injection-molding, has a good thermal stability, flow and processability, and can be used to produce golf balls endowed with excellent durability, scuff resistance and flexibility without any loss of rebound resilience, the inventors reached the discovery that norbornene dicarboxylic anhydrides and their derivatives are excellent interphase crosslinking agents between ionomeric resins and non-ionomeric thermoplastic resins.

That is, the inventors have discovered that interphase crosslinking between a non-ionomeric thermoplastic resin and an ionomeric resin can be carried out by, in the presence of a peroxide, grafting the double bond of a norbornene ring primarily onto the non-ionomeric thermoplastic resin and crosslinking the carboxylic anhydride residue (which may be ring-opened) with the ionomeric resin through ionic interactions, and have found that the resulting ionomeric resin composition is useful as a golf ball material which, when injection-molded, is capable of suppressing delamination.

The inventors have also found that an ionomeric resin composition with an IPN structure, obtained by blending such a norbornene dicarboxylic anhydride and/or derivatives thereof, in the presence of a peroxide, with a non-ionomeric thermoplastic resin and an acid-containing polymer that is the base polymer of an ionomeric resin, i.e., one or more acid-containing polymers selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers, to form an acid-containing polymer composition, then melt-mixing therein an oxygen-containing inorganic metal oxide-typed metal ionic species so as to induce both a grafting reaction involving the norbornene dicarboxylic anhydride and/or a derivative thereof and a neutralization reaction involving the acids, is useful as a golf ball material which suppresses delamination during injection molding.

Furthermore, the inventors have learned that, in case of a non-ionomeric thermoplastic resin used in the invention having basic functional groups (e.g., amino groups, imino groups), by adding a small amount of a polymer containing acids (e.g., carboxylic acids) other than acid anhydrides to the non-ionomeric thermoplastic resin, together with the norbornene dicarboxylic anhydride and/or a derivative thereof and the peroxide, the preferential reaction of the dicarboxylic anhydrides with the basic functional groups is mostly able to be prevented, and consequently even the ionomeric resin composition obtained according to the above procedures is suitable for a golf ball material which suppresses delamination during injection molding.

In the practice of the invention, by including a norbornene dicarboxylic anhydride and/or a derivative thereof in the ionomeric resin composition, non-ionomeric thermoplastic resins not compatible or poorly compatible with an ionomeric resin layer, can also be incorporated into the ionomeric resin composition relatively in good uniformity, thereby giving a golf ball material which suppresses delamination during injection-molding, has a good thermal stability, flow and processability, and can be used to produce golf balls having an excellent durability, scuff resistance and softness without any loss of rebound.

In the practice of the invention, if the norbornene dicarboxylic anhydride and/or a derivative thereof is not used in the step to prepare a non-ionomeric thermoplastic resin-containing ionomeric resin composition, delamination usually tend to arise. On the other hand, excess use of the above compound leads to gel formation, making the ionomeric resin composition non-uniform, and in turn preventing the physical properties that are the object of the inventive golf ball material from being achieved.

In the practice of the invention, a norbornene dicarboxylic anhydride and/or a derivative thereof, a peroxide, a non-ionomeric thermoplastic resin and an ionomeric resin are melt-blended in the step to prepare the non-ionomeric thermoplastic resin-containing ionomeric resin composition. It is preferable to first melt-blend the norbornene dicarboxylic anhydride and/or a derivative thereof, the peroxide and the non-ionomeric thermoplastic resin at a low temperature at which the peroxide can not decompose rapidly, then add the ionomeric resin and melt-mix the ingredients at the temperature or above at which the peroxide decomposes.

Also, in the step to prepare the non-ionomeric thermoplastic resin-containing ionomeric resin composition in the invention, by melt-blending the norbornene dicarboxylic anhydride and/or a derivative thereof, the peroxide, the non-ionomeric thermoplastic resin and the acid-containing polymer at a temperature low enough so that the peroxide can not decompose rapidly, then adding an oxygen-containing inorganic metal compound-typed metal ionic species and melt-mixing the ingredients at a temperature or above at which the peroxide decomposes, both grafting reaction of the unsaturated ring of the norbornene dicarboxylic anhydride and/or a derivative thereof and acid(s)-neutralizing reaction (neutralization reaction) take place simultaneously, thereby forming an ionomeric resin composition having an IPN structure. It is desirable in this case to use a process in which first the norbornene dicarboxylic anhydride and/or a derivative thereof, the peroxide, and the non-ionomeric thermoplastic resin are melt-blended at a temperature low enough so that the peroxide can not decompose rapidly, then the acid-containing polymer is melt-blended at a temperature low enough so that the peroxide can not decompose, and finally the oxygen-containing inorganic metal compound-typed metal ionic species is added and melt-blending is carried out at the temperature or above at which the peroxide decomposes.

In the practice of the invention, in case of the non-ionomeric thermoplastic resin having basic functional groups such as amino groups or imino groups, in order to avoid the preferential reaction of the dicarboxylic anhydrides with the basic functional groups, a polymer containing acids (e.g., carboxylic acids) other than acid anhydrides should be added together with the norbornene dicarboxylic anhydride and/or derivative thereof. In such a case, it is preferable to add the acid-containing polymer in an amount of which the acid content is at least 10% the molar amount of the dibasic acids in the norbornene dicarboxylic anhydride and/or a derivative thereof.

The norbornene dicarboxylic anhydride and/or a derivative thereof used in the invention is exemplified as follows.

Norbornene ring derivatives are halogen-, alkyl-, aryl- and aralkylnorbornenes; dicarboxylic anhydride derivatives are dicarboxylic acids, dicarboximides and derivatives thereof; and the dicarboxylic anhydride and derivatives thereof have a steric structures or stereoisomers such as exo isomer, endo isomer and a mixture thereof. Typical examples include cis-5-norbornene-endo-2,3-dicarboxylic anhydride, cis-5-norbornene-exo-2,3-dicarboxylic anhydride, methyl-cis-5-norbornene-endo-2,3-dicarboxylic anhydride, cis-5-norbornene-endo-2,3-dicarboximide and 1,4,5,6,7,7-hexachloro-5-norbornene-2,3-dicarboxylic anhydride. These compounds are added in an amount, based on the combined amount of the non-ionomeric thermoplastic resin and the ionomeric resin and/or the acid-containing polymer that is the base polymer of the ionomeric resin, of generally 0.05 to 20 parts by weight, preferably 0.1 to 10 parts by weight, and more preferably 0.5 to 5.0 parts by weight. If these compounds are added in excess, the resulting ionomeric resin composition exhibits a drastic decline in melt flow rate (MFR) and undergo gel formation, making it impossible to obtain normal molded parts. Conversely, if an excessively small amount of these compounds is added, the resulting Monomeric resin composition causes delamination during injection-molding, possibly raising a poor scuff resistance and a low rebound resilience, and thus having an adverse influence on the properties of the golf ball obtained as the finished product.

The peroxide used together with the norbornene dicarboxylic anhydride and/or a derivative thereof is suitably selected from viewpoints of both the decomposition temperature thereof and the melting temperature at which the non-ionomeric thermoplastic resin used can be kneaded. Typically used peroxides have a 1-minute half-life temperature of from 140 to 250° C., preferably 150 to 230° C., and more preferably 160 to 210° C. Illustrative examples of such peroxides that can be utilized include one or more selected from among dicumyl peroxide (1-minute half-life temperature, 175° C.), di-t-butyl peroxide (185° C.), 2,5-dimethyl-2,5-di(t-butylperoxy)-hexyne-3 (194° C.), n-butyl-4,4-di(t-butylperoxy) valerate (173° C.), di(2-t-butylperoxyisopropyl) benzene (175° C.), di-t-hexyl peroxide (177° C.) and p-menthanehydroperoxide (200° C.). Of these, the use of dicumyl peroxide, di-t-butyl peroxide and 2,5-dimethyl-2,5-di(t-butylperoxy)-3-hexyne is preferred. It is desirable to set the amount of the peroxide included, based on the combined amount of the non-ionomeric thermoplastic resin and the ionomeric resin and/or the acid-containing polymer serving as the base polymer thereof, at preferably from 0.05 to 20 parts by weight, more preferably from 0.08 to 15 parts by weight, even more preferably from 0.1 to 10 parts by weight, and most preferably from 0.5 to 5.0 parts by weight.

The non-ionomeric thermoplastic resins used in the invention are one or more selected from among polyolefin elastomers (including polyolefins and metallocene-catalyzed polyolefins), polystyrene elastomers, polyacrylate polymers, polyamide elastomers, polyurethane elastomers, polyester elastomers and polyacetals. Illustrative examples include polyethylene methacrylate, maleic anhydride-grafted polyethylene ethyl acrylate, hexamethylene diisocyanate (HDI)-poly-ε-caprolactone (PCL), 4,4'-dicyclohexylmethane diisocyanate (H12-MDI)-polytetramethylene glycol (PTMG), polystyrene-butylene, polybutylene terephthalate, polyether polyamide and polyoxymethylene. The weight ratio (non-ionomeric thermoplastic resin/ionomeric resin or acid-containing polymer serving as the base polymer thereof) is typically from 1/99 to 99/1, preferably from 5/95 to 95/5, and more preferably from 10/90 to 90/10.

The ionomers used in the invention are one or more ionomers obtained by neutralizing, within a degree of neutralization range of 5 to 90 mol %, one or more polymers having an acid content of 0.5 to 30 wt %, preferably 1.0 to 25 wt %, with one or more metal cations selected from among groups IA, IB, IIA, IIB, IIIA, IIIB, IVA, IVB, VA, VB, VIA, VIB, VIIB AND VIIIB of the periodic table. The acid content polymers above are selected from among olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers, and unsaturated dicarboxylic acid half ester-containing polymers.

Illustrative examples include a 60 mol % Zn (degree of neutralization with zinc)—polyethylene-methacrylic acid copolymer, a 40 mol % Mg (degree of neutralization with magnesium)—polyethylene-methacrylic acid copolymer, and a 40 mol % Mg (degree of neutralization with magnesium)—polyethylene-methacrylic acid-isobutyl acrylate terpolymer.

In the practice of the invention, in case of the non-ionomeric thermoplastic resin having a basic functional groups such as amino groups or imino groups, a polymer containing acids (e.g., carboxylic acids) other than acid anhydrides should be used to avoid the preferential reaction of the norbornene dicarboxylic anhydride and/or a derivative thereof with the basic functional groups. Such a polymer is exemplified by an olefin-unsaturated carboxylic acid copolymer having an acid content of 0.5 to 30 wt %, and preferably 1.0 to 25 wt %. The number of carbons on the olefin is generally at least 2 and not more than 8, preferably not more than 6. Illustrative examples of such olefins include ethylene, propylene, butene, pentene, hexene, heptene and octene. The use of ethylene is especially preferred. Illustrative examples of the unsaturated carboxylic acid include acrylic acid, methacrylic acid, maleic acid (anhydride), and fumaric acid. The use of acrylic acid and methacrylic acid is especially preferred.

Alternatively, an olefin-unsaturated carboxylic acid-unsaturated carboxylic acid ester terpolymer can be used as the polymer containing acids other than acid anhydrides. The unsaturated carboxylic acid ester is preferably a lower alkyl ester of an unsaturated carboxylic acid. For example, use can be made of any one or more alkyl acrylates selected from among methyl methacrylate, ethyl methacrylate, propyl methacrylate, butyl methacrylate, methyl acrylate, ethyl acrylate, propyl acrylate and butyl acrylate. The use of butyl acrylate (n-butyl acrylate, isobutyl acrylate) is especially preferred. It is desirable for the acid-containing polymer to be used in an acid-containing molar amount which is at least 10% the molar amount of the dibasic acids in the norbornene dicarboxylic anhydride and/or a derivative thereof.

In the invention, the acid-containing polymer composition prepared from the norbornene dicarboxylic anhydride and/or a derivative thereof, the peroxide, the non-ionomeric thermoplastic resin and the acid-containing polymer which is the base polymer of an ionomeric resin is subjected to the neutralization reaction with a metal ionic species to form an ionomer resin composition having an IPN structure. The oxygen-containing inorganic metal compound-typed metal ionic species used in the neutralization reaction are one or more selected from the group consisting of lithium carbonate, sodium carbonate, potassium carbonate, magnesium carbonate, zinc carbonate, magnesium hydroxide, magnesium oxide, calcium hydroxide, calcium oxide and zinc oxide. It is preferable for these oxygen-containing inorganic metal compounds to be used in the form of nanoparticles or a master batch, that is, a concentrate. The amount of these metal ionic species used, that is, the degree of neutralization depends upon the acid content of the acid-containing polymer serving as the base polymer of an ionomeric resin that is used, with the degree of neutralization generally being from 1 to 95 mol %, preferably from 5 to 90 mol %, and even more preferably from 10 to 80 mol %. If the degree of neutralization is too high, the flow properties of the ionomeric resin composition become detracted (i.e., the melt index decreases), which makes injection molding difficult to carry out. Moreover, during injection molding, the heat generated by shear arises, causing thermal degradation and delamination of the non-ionomeric thermoplastic resin incorporated within the ionomeric resin composition. Conversely, if the degree of neutralization is excessively low, although the composition has flow properties, due to a decline in the degree of ionic crosslinking, the mechanical strength of the ionomeric resin composition itself decreases, which results in a decline in ball strength and a poor durability when the composition is used as a golf ball material.

It is desirable for the acid neutralizing reaction on the acid-containing polymer composition by the oxygen-containing inorganic metal compound-type metal ionic species to be carried out using a vacuum-vented twin-screw extruder having arranged thereon a screw segment with a kneading disc zone.

Optional additives are included in the golf ball material of the invention, in line with the intended use. When the golf ball material of the invention is to be used as a cover material, in addition to the above-described essential ingredients, additives such as pigments, dispersants, antioxidants, ultraviolet absorbers and light stabilizers are also included. Such additives are typically included in an amount, per 100 parts by weight of the essential ingredients, of generally at least 0.1 part by weight, and preferably at least 0.5 part by weight, but generally not more than 10 parts by weight, and preferably not more than 4 parts by weight.

The golf ball material in the invention has a specific gravity of generally at least 0.9, preferably at least 0.92, and more preferably at least 0.94, but generally not more than 1.3, preferably not more than 1.2, and more preferably not more than 1.05.

Parts obtained using the inventive golf ball material typically have a Shore D hardness of at least 40, and preferably at least 45, but not more than 75, and preferably not more than 70. If the Shore D hardness is excessively high, there is a marked decline in the impact feeling of the resulting golf ball when hitting it. On the other hand, if the Shore D hardness is excessively low, the rebound resilience of the ball decreases.

The inventive golf ball materials which are an ionomeric resin composition are used as a cover material or an intermediate layer material in a two-piece solid golf ball composed of a core and a cover embracing the core, or in a multi-piece solid golf ball composed of a core of at least one layer, an intermediate layer of at least one layer embracing the core, and a cover of at least one layer which embraces the intermediate layer.

The inventive golf ball material and method of preparation thereof is substantially composed of either an ionomeric resin composition obtained by melt-mixing under applied heat a norbornene dicarboxylic anhydride and/or a derivative thereof, in the presence of a peroxide, with a non-ionomeric thermoplastic resin and an ionomeric resin, or an ionomeric resin composition having IPN structures obtained by similarly melt-mixing under applied heat but using, instead of the ionomer, the base polymer (an acid-containing polymer) of the ionomer, then carrying out the acid-neutralizing reaction with a metal ionic species. As a result, delamination during injection-molding is suppressed, the golf ball material exhibits a good thermal stability, flow and processability, and high-performance golf balls endowed with excellent properties such as durability, scuff resistance and flexibility can be obtained.

EXAMPLES

Examples are given below by way of illustration and not by way of limitation. The twin-screw extruder used in the examples of the invention to carry out the reactions ("reaction twin-screw extruder") had a screw diameter of 32 mm, an overall L/D ratio of 41, and an L/D ratio for the kneading disc zone which was 40% of the overall L/D ratio. Moreover, it had a vacuum vent port and was equipped with a device for injecting water under pressure.

[Preparation of Metal Oxide Master Batch (Concentrate) "MgMB"]

A 5-liter compression kneader (manufactured by Naniwa Machinery Manufacturing Co., Ltd.; setting temperature, 100° C.) was applied. The base polymer for the master batch was N0200H (an ethylene-methacrylic acid-isobutyl acrylate terpolymer produced by E.I. DuPont de Nemours & Co.), and magnesium hydroxide (average particle size, 0.84 μm; produced by Kyowa Chemical Industry Co., Ltd.) was used. The kneader was charged with a combined amount of 2.0 kg of the N0200H and the magnesium hydroxide $Mg(OH)_2$ in a 50/50 weight ratio, and kneading was carried out for 20 minutes under an applied pressure of 0.49 MPa at a rotor speed of 35 rpm and at a kneading temperature controlled within a range of 120 to 130° C. The mixture was discharged as strands from a 40 mm diameter twin-screw/single-screw extruder (Naniwa Machinery Manufacturing Co., Ltd.; setting temperature, 180° C.), passed through a cooling water bath and by an air knife, then pelletized. The melt flow rate (MFR) of the resulting magnesium hydroxide-containing master bath having a $Mg(OH)_2$ content of 50 wt % was 2.3 g/10 min (measured at 190° C. Under a load of 2,160 g). This master batch was designated below as "MgMB."

Example 1

An acid-containing polymer composition was obtained by the preliminary mixture, in the proportions indicated in Table 1 and at a melting temperature at which the peroxide PO does not decompose (170° C.), of the respective ingredients, including "NDA," without the MgMB.

Next, the amount of MgMB shown in Table 1 was added to this polymer composition, then both the neutralization reaction with a degree of neutralization 40 mol % and decomposition of the PO were carried out through (or by use of) the reaction twin-screw extruder at a setting temperature 200° C., thereby giving a uniform ionomeric resin composition. The melt flow rate (MFR) and Shore D hardness of the resulting ionomeric resin composition were shown in Table 1. As shown in Table 1, the ionomeric resin composition in this example had a suitable hardness and a melt flow rate appropriate for injection molding. Next, using this ionomeric resin composition as the cover material for two-piece golf balls, the composition was injection-molded over a core of crosslinked butadiene rubber (core properties: diameter, 38.9 mm; weight, 36.0 g; deflection, 3.35 mm) using an injection-molding machine (setting temperatures: hopper, 160° C.; C1 to head, 180 to 210° C.) at an injection pressure of 5.9 MPa, a holding pressure of 4.9 MPa, an injection and holding time of 8 seconds, and a cooling time of 25 seconds, thereby producing two-piece golf balls (diameter, 42.7 mm; weight, 45.5 g). These golf balls were then evaluated. The results were shown in Table 1. After injection-molding, the surface of the golf ball was trimmed, yielding a finished golf ball with a smooth surface free of burrs, a good scuff resistance, excellent ball durability (number of shots, 202), a high initial velocity and a high coefficient of restitution (COR).

Example 2

Aside from replacing some portion of the Polymer 4 with Polymer 3 in the formulation shown in Table 1, a uniform ionomeric resin composition was obtained by following the same procedures as in Example 1. The results were shown in Table 1. After injection-molding, the surface of the golf ball was trimmed, yielding a finished golf ball with a smooth surface free of burrs, a good scuff resistance, excellent ball durability (number of shots, more than 250), a high initial velocity and a high coefficient of restitution (COR).

Control 1

As a control for Example 1 of the invention, an ionomeric resin composition was obtained by following the same procedures as in Example 1, but using the formulation shown in Table 1 from which NDA and PO were excluded. The results were shown in Table 1. After injection-molding, the surface of the golf ball was trimmed, yielding a finished golf ball with burrs thereon (coarse surface, delamination) and a markedly decreased ball durability (number of shots, 114). The coefficient of restitution (COR) was also lower, and the initial velocity was slightly higher.

Control 2

As a control for Example 1 of the invention, an ionomeric resin composition was obtained by using the respective ionomer ingredients in the formulation shown in Table 1, which excluded NDA and PO, and melt-mixing with a twin-screw extruder set at 210° C. The results were shown in Table 1. After injection-molding, the surface of the golf ball was trimmed, yielding a finished golf ball with burrs thereon (coarse surface) and a markedly decreased ball durability (number of shots, 131). The coefficient of restitution (COR) was also lower, and the initial velocity was slightly higher.

TABLE 1

| | Example | | Control | |
| --- | --- | --- | --- | --- |
| Phase | 1 | 2 | 1 | 2 |
| a. MgMB | 3.12 | 2.91 | 3.12 | — |
| b. TPU | 20 | 20 | 20 | 20 |
| c. Polymer 1 | — | — | — | — |
| d. NDA | 0.7 | 0.7 | — | — |
| e. PO | 0.2 | 0.23 | — | — |
| f. Polymer 2 | 10 | 10 | 10 | |
| f'. Polymer 2' | | | | 10 |
| g. Polymer 3 | — | 10 | — | — |
| h. Polymer 4 | 70 | 60 | 70 | |
| h'. Polymer 4' | | | | 70 |
| i. $TiO_2$ | 1.0 | 1.0 | 1.0 | 1.0 |
| j. Blue pigment | 0.02 | 0.02 | 0.02 | 0.02 |
| Specific gravity | 0.984 | 0.982 | 0.985 | 0.986 |
| MFR (g/10 min, 190° C.) | 3.5 | 2.3 | 9.4 | 5.5 |
| Hardness (Shore D) | 59 | 58 | 59 | 59 |
| Deflection (mm), 23° C. (μ) | 2.65 | 2.72 | 2.76 | 2.77 |
| Initial velocity (m/sec), 23° C. | 78.27 | 78.21 | 78.40 | 78.47 |
| Average COR (first shot to final shot until ball cracks) | 0.8138 | 0.8119 | 0.8080 | 0.8052 |
| Shot number (durability) | 202 | >250 | 114 | 131 |
| Scuff resistance (23° C.) (score) | 3 | 2-3 | 3-4 | 4 |
| Abrasion resistance (sand) (rating) | Good | Good | Poor | Poor |
| Golf ball surface after trimming with #500 for 3.5 sec | Smooth | Smooth | Rough | Rough |

Note:
Numbers shown for Ingredients a to j in table indicate parts by weight.

Ingredient names and other entries in the above table are explained below.

a. MgMB
Magnesium hydroxide/ethylene-methacrylic acid-isobutyl acrylate terpolymer=50/50 wt %.

b. TPU
Aliphatic polyurethane (HMDI-PCL), produced by DIC-Bayer.

c. Polymer 1
Ethylene-ethyl acrylate-maleic anhydride terpolymer, produced by ARKEMA.

d. NDA
5-Norbornene-2,3-dicarboxylic anhydride, produced by Hitachi Chemical.

e. PO
2,5-Dimethyl-2,5-di(t-butylperoxy)-hexyne-3, produced by NOF Corporation.

f. Polymer 2
Ethylene-methacrylic acid copolymer (MFR, 500 g/10 min), produced by DuPont.

f'. Polymer 2'
Polymer 2 in which 40 mol % of acid groups are neutralized with magnesium ions.

g. Polymer 3
Ethylene-methacrylic acid-isobutyl acrylate terpolymer (MFR, 31 g/10 min), produced by DuPont.

h. Polymer 4
Ethylene-methacrylic acid copolymer (MFR, 60 g/10 min), produced by DuPont.

h'. Polymer 4'
Polymer 4 in which 40 mol % of acid groups are neutralized with magnesium ions.

i. $TiO_2$
Tipaque PF737, produced by Ishihara Sangyo Kaisha.

j. Blue Pigment
Color index: Pigment Blue 29, produced by Toyo Ink.

MFR (q/10 min)
The melt flow rate was measured in accordance with JIS-K7210 at a test temperature of 190° C. and a test load of 21.18 N (2.16 kgf).

Shore D Hardness
The Shore D hardness was measured in accordance with ASTM D-2240.

Deflection (mm), 23° C. (μ)
The golf ball was placed between two steel plates one bottom plate of which is fixed and another plate is movable downward, and the deflection (mm) by the ball when compressed under a final load of 1,275 N (130 kgf) from an initial load of 98 N (10 kgf) was measured.

Initial Velocity (m/sec), 23° C.
The initial velocity was measured using an initial velocity measuring apparatus of the same type as the USGA drum rotation-typed initial velocity instrument approved by the R&A. The ball was kept isothermally at a temperature of 23±1° C. for at least 3 hours, then tested in a chamber controlled at a room temperature of 23±2° C. The ball was hit using a 250-pound (113.4 kg) head (striking mass) at an impact velocity of 143.8 ft/s (43.83 m/s). Ten balls were each hit twice. The time taken to traverse a distance of 6.28 ft (1.91 m) was measured and used to compute the initial velocity of the ball. This cycle was carried out over a period of about 15 minutes.

Coefficient of Restitution (COR)
The ball was fired from an air cannon against a steel plate at a velocity of 43 m/s, and the rebound velocity was measured. The coefficient of restitution (COR) is the ratio of the rebound velocity to the initial velocity of the ball.

Durability
The durability of the golf ball was evaluated using an ADC Ball COR Durability Tester produced by Automated Design Corporation (U.S.). This tester has the ability to fire a golf ball using air pressure and cause it to repeatedly strike two steel plates arranged in parallel. The average number of shots required for a ball to crack was treated as the durability. These average values were obtained by furnishing four balls of the same type for testing, repeatedly firing each ball until it cracked, and averaging the number of shots required for the respective balls to crack. The type of tester used was a horizontal COR durability tester, and the incident velocity of the balls on the steel plates was 43 m/s.

Scuff Resistance (23° C.)
The golf balls were held at a temperature of 23° C. and hit at a head speed of 33 m/s using a pitching wedge mounted on a swing robot machine, after which damages from the impact were visually rated according to the following 6-point scale.

| | |
|---|---|
| Best: | 1 point |
| Better: | 2 points |
| Good: | 3 points |
| Poor: | 4 points |
| Poorer: | 5 points |
| Poorest: | 6 points |

Abrasion Resistance (Sand)
A tubular container having a five-liter volume was filled with 15 golf balls and 1.7 liters of sand, after which the contents were mixed at 50 rpm for 2 hours. The balls were then removed and, based on a visual determination of the extent of abraded surface and decreased gloss due to abrasion, the abrasion resistance was rated as: Best, Better, Good, Poor, Poorer or Poorest.

Ball Appearance after Surface-Trimming
The injection-molded golf ball had its surface trimmed with a #500 grinding wheel for 3.5 seconds, following which the surface appearance of the ball was rated as: Smooth, Less rough, or Rough.

Example 3

In the formulation shown in Table 2, NDA and PO were included and, aside from replacing some portion of Polymer 4 with Polymer 1, a uniform ionomeric resin composition was obtained by following the same procedures as in Example 1. The results were shown in Table 2. After injection molding, the surface of the golf ball was trimmed, yielding a finished golf ball with a slight amount of burrs (some delamination) and excellent ball durability (number of shots, 202), a good scuffing resistance, a high initial velocity and a high coefficient of restitution (COR).

Control 3

As a control for Example 3 of the invention, an ionomeric resin composition was obtained by following the same procedure as in Example 3, but using the formulation shown in Table 2 from which NDA and PO were excluded. The results were shown in Table 2. After injection-molding, the surface of the golf ball was trimmed, yielding a finished golf ball with burrs thereon (delamination) and a decreased ball durability (number of shots, 189). The coefficient of restitution (COR) was also lower, and the initial velocity was slightly higher.

Control 4

As a control for Example 3 of the invention, an ionomeric resin composition was obtained by using the respective ionomer ingredients in the formulation shown in Table 2, which excluded NDA and PO, and melt-mixing with a twin-screw extruder set at 210° C. The results were shown in Table 2. After injection-molding, the surface of the golf ball was trimmed, yielding a finished golf ball with burrs thereon (delamination) and a markedly decreased ball durability (number of shots, 106). The coefficient of restitution (COR) was also lower, and the initial velocity was slightly higher.

TABLE 2

| Phase | Example 3 | Control 3 | Control 4 |
|---|---|---|---|
| a. MgMB | 2.58 | 2.58 | — |
| b. TPU | 20 | 20 | 20 |
| c. Polymer 1 | 13 | 13 | 13 |
| d. NDA | 0.7 | — | — |
| e. PO | 0.2 | — | — |
| f. Polymer 2 | 10 | 10 | |
| f'. Polymer 2' | | | 10 |
| g. Polymer 3 | — | — | — |
| h. Polymer 4 | 57 | 57 | |
| h'. Polymer 4' | | | 57 |
| i. TiO$_2$ | 1.0 | 1.0 | 1.0 |
| j. Blue pigment | 0.02 | 0.02 | 0.02 |
| Specific gravity | 0.982 | 0.986 | 0.986 |
| MFR (g/10 min, 190° C.) | 2.3 | 5.3 | 5.4 |
| Hardness (Shore D) | 54 | 54 | 54 |
| Deflection (mm), 23° C. (μ) | 2.73 | 2.82 | 2.85 |
| Initial velocity (m/sec), 23° C. | 78.16 | 78.25 | 78.31 |
| Average COR (first shot to final shot until ball cracks) | 0.8126 | 0.8025 | 0.8037 |
| Shot number (durability) | >250 | 189 | 106 |
| Scuff resistance (23° C.) (score) | 3 | 3-4 | 4 |
| Abrasion resistance (sand) (rating) | Good | Poor | Poorer |
| Golf ball surface after trimming with #500 for 3.5 sec | Less rough | Rough | Rough |

Note:
Numbers shown for Ingredients a to j in table indicate parts by weight.

The invention claimed is:

1. A golf ball material comprising: (i) a non-ionomeric thermoplastic resin, (ii) an ionomeric resin and/or an acid-containing polymer selected from the group consisting of olefin unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers, and unsaturated dicarboxylic acid half ester-container polymers, and (iii) a norbornene dicarboxylic anhydride and/or a derivative thereof, which is obtained by the steps of, in order, melt-blending (iii) a norbornene dicarboxylic anhydride and/or a derivative thereof, a peroxide, and (i) the non-ionomeric thermoplastic resin in a temperature range at which the peroxide does not decompose too soon; adding (ii) the ionomeric resin and/or the acid-containing polymer; and melt-mixing at the temperature or above at which the peroxide decomposes;
wherein the non-ionomeric thermoplastic resin (i) is one or more selected from among polystyrene elastomers, polyacrylate polymers, polyurethane elastomers and polyacetals, and the weight ratio (i)/(ii) is from 1/99 to 99/1.

2. The golf ball material of claim 1, wherein in the ingredient (iii), norbornene ring derivatives are halogen-, alkyl-, aryl- or aralkylnorbornenes; dicarboxylic anhydride derivatives are dicarboxylic acids, dicarboximides or derivatives thereof; and the dicarboxylic anhydride and derivatives thereof have steric structures of exo isomers, endo isomers or a mixture thereof.

3. The golf ball material of claim 1, wherein the ingredient (iii) is included in an amount of 0.05 to 20 parts by weight per 100 parts by weight of the combined amount of the ingredients (i) and (ii).

4. The golf ball material of claim 1, wherein the non-ionomeric thermoplastic resin (i) has basic functional groups and the acid-containing polymer (ii) has acid groups other than acid anhydrides.

5. A golf ball comprising as a component therein a part made of the golf ball material of any one of claims 1 to 4.

6. A golf ball wherein the golf ball material of any one of claims 1 to 4 is used as a cover material or an intermediate layer material in a two-piece solid golf ball composed of a core and a cover which embraces the core, or in a multi-piece solid golf ball composed of a core of at least one layer, an intermediate layer of at least one layer embracing the core, and a cover of at least one layer embracing the intermediate layer.

7. The golf ball material of claim 1, wherein the peroxide is selected from among compounds having a 1-minute half-life decomposition temperature in a range of 140 to 250° C., and is added in an amount of 0.05 to 15 parts by weight per 100 parts by weight of the combined amount of the resin ingredients.

8. The golf ball material of claim 1, wherein the ingredient (ii) is an ionomer obtained by neutralizing one or more polymers having an acid content of 0.5 to 30 wt % and selected from among olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers, and unsaturated dicarboxylic acid half ester-containing polymers with one or more metal cations selected from among groups IA, IB, IIA, IIB, IIIA, IIIB, IVA, IVB, VA, VB, VIA, VIIB, VIIB and VIIIB of the periodic table.

9. The golf ball material of claim 1, wherein the acid-containing polymer is one or more polymers selected from among olefin-unsaturated carboxylic acid copolymers and olefin-unsaturated carboxylic acid-unsaturated carboxylic acid ester terpolymers.

10. A golf ball material comprising: (i) a non-ionomeric thermoplastic resin, (ii) an acid-containing polymer selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers, and unsaturated dicarboxylic acid half ester-containing polymers, and (iii) a norbornene dicarboxylic anhydride and/or a derivative thereof, which is obtained by the steps of, in order, melt-blending (iii) the norbornene dicarboxylic anhydride and/or the derivative thereof, a peroxide, (i) the non-ionomeric thermoplastic resin, and (ii) the acid-containing polymer in a temperature range at which the peroxide does not decompose rapidly; adding an oxygen-containing inorganic metal compound typed metal ionic species; and melt-blending at the temperature or above at which the peroxide decomposes so as to induce both the grafting reaction of the norbornene dicarboxylic anhydride and/or a derivative thereof and the acid-neutralizing reaction, thereby obtaining a golf ball material having interpenetrating polymer network structures;
wherein the non-ionomeric thermoplastic resin (i) is one or more selected from among polystyrene elastomers, polyacrylate polymers, polyurethane elastomers and polyacetals, and the weight ratio (i)/(ii) is from 1/99 to 99/1.

11. The golf ball material of claim 10, wherein in the ingredient (iii), norbornene ring derivatives are halogen-, alkyl-, aryl- or aralkylnorbornenes; dicarboxylic anhydride derivatives are dicarboxylic acids, dicarboximides or derivatives thereof; and the dicarboxylic anhydride and derivatives thereof have steric structures of exo isomers, endo isomers or a mixture thereof.

12. The golf ball material of claim 10, wherein the ingredient (iii) is included in an amount of 0.05 to 20 parts by weight per 100 parts by weight of the combined amount of the ingredients (i) and (ii).

13. The golf ball material of claim 10, wherein the non-ionomeric thermoplastic resin (i) has basic functional groups and the acid-containing polymer (ii) has acid groups other than acid anhydrides.

14. The golf ball material of claim 10, wherein the peroxide is selected from among compounds having a 1-minute half-life decomposition temperature in a range of 140 to 250° C., and is added in an amount of 0.05 to 15 parts by weight per 100 parts by weight of the combined amount of the resin ingredients.

15. The golf ball material of claim 10, wherein the oxygen-containing inorganic metal compound typed metal ionic species is one or more selected from the group consisting of lithium carbonate, sodium carbonate, potassium carbonate, magnesium carbonate, zinc carbonate, magnesium hydroxide, magnesium oxide, calcium hydroxide, calcium oxide and zinc oxide, and the oxygen-containing inorganic metal compound is used in the form of nanoparticles or a master batch.

16. The golf ball material of claim 10, wherein the acid-containing polymer is one or more polymers selected from among olefin-unsaturated carboxylic acid copolymers and olefin-unsaturated carboxylic acid-unsaturated carboxylic acid ester terpolymers.

17. The golf ball material of claim 10, wherein the acid-neutralizing reaction on the acid-containing polymer composition by the oxygen-containing inorganic metal compound-typed metal ionic species is carried out using a vacuum-vented twin-screw extruder having arranged thereon a screw segment with a kneading disc zone.

* * * * *